United States Patent
Suwa et al.

(10) Patent No.: US 9,204,465 B2
(45) Date of Patent: Dec. 1, 2015

(54) WIRELESS COMMUNICATION SYSTEM AND WIRELESS COMMUNICATION DEVICE

(75) Inventors: Yutaka Suwa, Fukuoka (JP); Hiroyuki Ishihara, Fukuoka (JP); Akira Shibuta, Fukuoka (JP); Konomi Suwa, Fukuoka (JP)

(73) Assignee: Pansonic Intellectual Property Management Co., Ltd., Osaka (JP)

( * ) Notice: Subject to any disclaimer, the term of this patent is extended or adjusted under 35 U.S.C. 154(b) by 273 days.

(21) Appl. No.: 13/884,361

(22) PCT Filed: Nov. 10, 2011

(86) PCT No.: PCT/JP2011/006282
§ 371 (c)(1),
(2), (4) Date: May 9, 2013

(87) PCT Pub. No.: WO2012/063491
PCT Pub. Date: May 18, 2012

(65) Prior Publication Data
US 2013/0272277 A1    Oct. 17, 2013

(30) Foreign Application Priority Data
Nov. 10, 2010  (JP) .................................. 2010-251479

(51) Int. Cl.
*H04W 88/06* (2009.01)
*H04W 88/10* (2009.01)
(Continued)

(52) U.S. Cl.
CPC ...... *H04W 74/0816* (2013.01); *H04W 52/0216* (2013.01); *H04W 56/0015* (2013.01);
(Continued)

(58) Field of Classification Search
None
See application file for complete search history.

(56) References Cited

U.S. PATENT DOCUMENTS 6,018,642 A     1/2000  Adachi
6,438,117 B1 *  8/2002  Grilli et al. .................... 370/331
(Continued)

FOREIGN PATENT DOCUMENTS

JP    9-162798 A      6/1997
JP    2005-167898 A   6/2005
(Continued)

OTHER PUBLICATIONS

International Search Report, mailed Dec. 6, 2011, for corresponding International Application No. PCT/JP2011/006282, 5 pages.
(Continued)

*Primary Examiner* — Jenee Williams
(74) *Attorney, Agent, or Firm* — Seed IP Law Group PLLC

(57) ABSTRACT

In a wireless communication system that conducts a communication between a base station and a terminal the base station includes a first communication unit using a first communication system of a TDMA system, and a second communication unit using a second communication system, and the terminal includes a third communication unit using the first communication system, and a fourth communication unit using the second communication system. The base station transmits a control signal in the first communication system with the use of the first communication unit, and the base station determines timing of transmission for the second communication unit according to timing of TDMA of the first communication unit. The third communication unit receives the control signal transmitted from the base station in the first communication system, and the fourth communication unit controls receiving operation according to information included in the control signal.

15 Claims, 14 Drawing Sheets

(51) Int. Cl.
  *H04W 52/02* (2009.01)
  *H04W 74/08* (2009.01)
  *H04W 56/00* (2009.01)
  *H04W 16/14* (2009.01)
  *H04B 7/26* (2006.01)

(52) U.S. Cl.
  CPC .............. *H04B7/2643* (2013.01); *H04W 16/14* (2013.01); *H04W 88/06* (2013.01); *H04W 88/10* (2013.01); *Y02B 60/50* (2013.01)

(56) References Cited

U.S. PATENT DOCUMENTS

| | | | |
|---|---|---|---|
| 2002/0059434 A1* | 5/2002 | Karaoguz et al. | 709/228 |
| 2002/0141441 A1* | 10/2002 | Neumann et al. | 370/465 |
| 2005/0018613 A1* | 1/2005 | Yokota | 370/248 |
| 2005/0020299 A1* | 1/2005 | Malone et al. | 455/552.1 |
| 2005/0032542 A1* | 2/2005 | Wilborn et al. | 455/525 |
| 2005/0135303 A1* | 6/2005 | Cromer et al. | 370/329 |
| 2006/0002323 A1* | 1/2006 | Hildebrand et al. | 370/321 |
| 2006/0039332 A1* | 2/2006 | Kotzin | 370/338 |
| 2006/0171345 A1* | 8/2006 | Hildebrand et al. | 370/319 |
| 2006/0215593 A1* | 9/2006 | Wang et al. | 370/315 |
| 2007/0008925 A1* | 1/2007 | Dravida et al. | 370/331 |
| 2007/0026890 A1 | 2/2007 | Nakagawa et al. | |
| 2007/0238482 A1* | 10/2007 | Rayzman et al. | 455/552.1 |
| 2007/0263551 A1* | 11/2007 | Birchler et al. | 370/254 |
| 2008/0004070 A1 | 1/2008 | Piipponen et al. | |
| 2008/0227488 A1* | 9/2008 | Zhu et al. | 455/553.1 |
| 2008/0287153 A1* | 11/2008 | Fullam | 455/502 |
| 2009/0028115 A1 | 1/2009 | Hirsch | |
| 2010/0118841 A1* | 5/2010 | Kalhan | 370/338 |
| 2010/0118842 A1* | 5/2010 | Kalhan | 370/338 |
| 2011/0103318 A1* | 5/2011 | Ekici et al. | 370/329 |
| 2012/0033658 A1* | 2/2012 | Ganesan | 370/338 |
| 2012/0257521 A1* | 10/2012 | Mehta | 370/252 |
| 2013/0100944 A1* | 4/2013 | Kwon et al. | 370/338 |
| 2014/0056192 A1* | 2/2014 | Meylan et al. | 370/311 |

FOREIGN PATENT DOCUMENTS

| | | |
|---|---|---|
| JP | 2005-286406 A | 10/2005 |
| JP | 2007-329609 A | 12/2007 |
| JP | 2008-263335 A | 10/2008 |
| JP | 2009-152976 A | 7/2009 |

OTHER PUBLICATIONS

Extended European Search Report, mailed Jul. 22, 2013, for EP 11 84 0041, 8 pages.

* cited by examiner

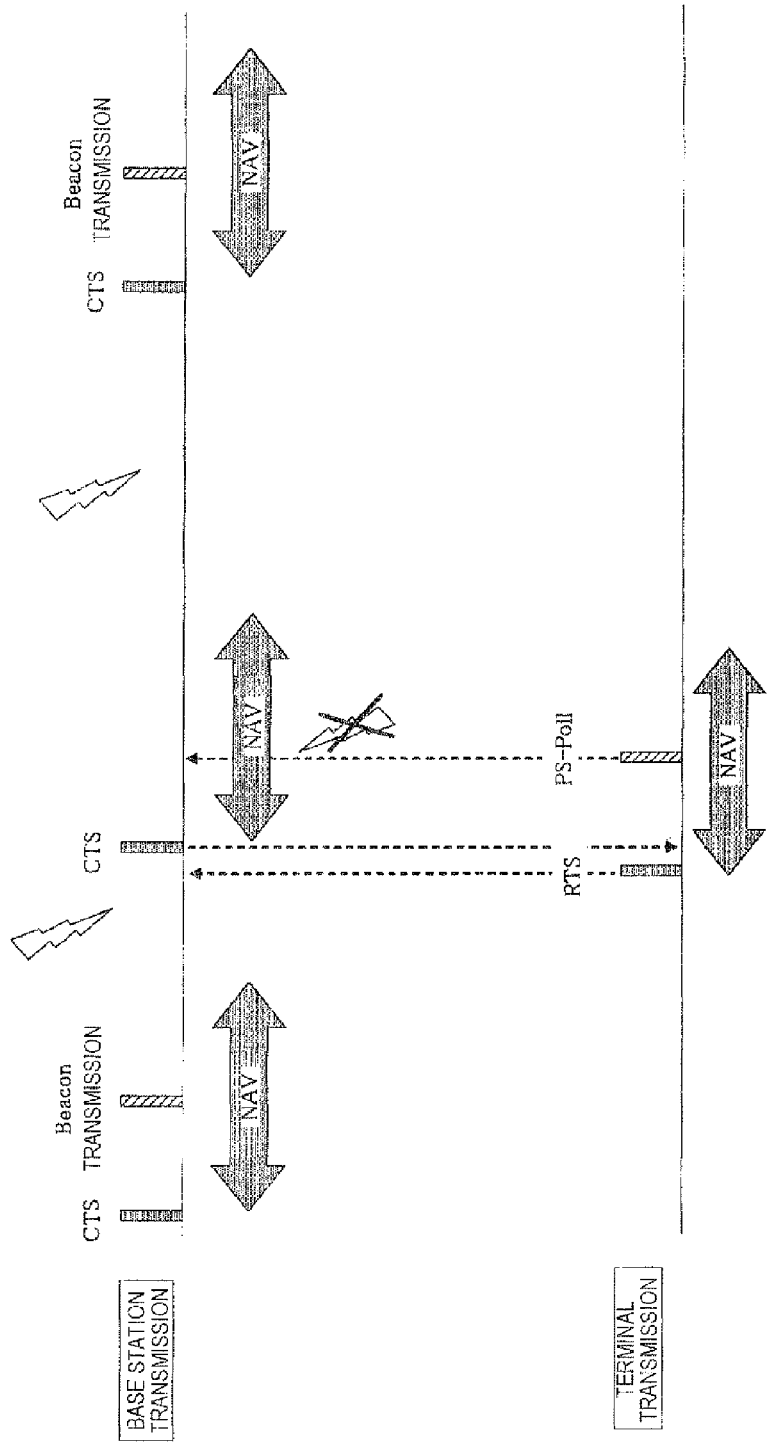

WIRELESS COMMUNICATION SYSTEM AND WIRELESS COMMUNICATION DEVICE

TECHNICAL FIELD

The present invention relates to a wireless communication system including a portable terminal and a plurality of base stations that conducts a wireless communication with the terminal, and relates to a wireless communication device.

BACKGROUND ART

Especially in Europe, there are local-area wireless communication systems including a plurality of base stations and a main device in conformity to DECT (digital enhanced cordless telecommunications) standard. The DECT standard employs TDMA-TDD (time division multiple access-time division duplex), and as one configuration thereof, a configuration that substantially periodically conducts calls and communications with one cycle having 12 slots in total of 6 transmission slots and 6 reception slots. When a communication system of the DECT standard is used for telephone calls, a high sound quality can be expected, and a reduction in the costs of the base stations and the terminal can be also expected.

On the other hand, wireless communication systems with an access point that communicates through a wireless LAN (hereinafter referred WiFi) using a communication standard of IEEE 802.11 series is also one of widespread communication systems, which are unfit for the telephone communication but suitable for a fast communication intended for personal computers. Also, in the WiFi (802.11), if the terminal is always operated in a reception mode, a communication from the base stations reaches the terminal substantially in real time. However, if the terminal is operated in a sleep mode, the base station repeats temporal activation at timing of beacon periodically transmitted by the base station. When TIM (traffic indication map) information is included in the beacon transmitted by the base station, the terminal that has temporarily been activated finds whether the base station holds a data frame addressed to the subject base station, or not. Also, when DTIM information is included in a beacon transmitted by the base station, the terminal finds that the base station holds a data frame for broadcast or multicast.

The base station that conducts a WiFi communication broadcasts the beacon including TIM at respective beacon intervals. For example, a certain terminal (terminal A) is activated for receiving the TIM at every two intervals. On the other hand, the other terminal (terminal B) is activated for receiving the TIM at every three intervals. Accordingly, in the case of the second beacon, only the terminal A is activated for receiving the TIM.

When data frames for allowing the base station to broadcast the data frames addressed to the respective terminals are buffered, not the TIM but DTIM is included in the beacon transmitted by the base station, which is indicative of the presence of data addressed to the terminal. For example, the terminal A that has received the second beacon and the DTIM finds that data present in the base station is data for broadcast. Therefore, when the terminal A finds that the frame is buffered by the base station, the terminal A issues PS-Poll to the base station, and the data frame is transmitted from the base station to the terminal A in response to the PS-Poll. After completion of this communication, the terminal A returns to the sleep mode. During the above operation, the terminal B is kept in the sleep mode. In the case of the third beacon, the terminal A remains slept, the terminal B is activated for receiving the beacon, and the terminal B receives the beacon transmitted by the base station. If the DTIM information is included in the beacon received by the terminal B, the terminal B issues PS-Poll to the base station, and the data frame is transmitted from the base station to the terminal B. In the case of the fourth beacon, the terminal A is activated for receiving the beacon.

CITATION LIST

Patent Literature

Patent Literature 1 JP-A-2005-167898
Patent Literature 2: JP-A-2008-263335
Patent Literature 3: JP-A-9-162798

SUMMARY OF INVENTION

Technical Problem

However, in the system that conducts the WiFi communication described above, if a plurality of terminals is present, timing when the terminals communicate with the base station can collide with each other, and reception timing cannot be matched. In this case, a certain terminal waits for transmission of the data frame from the base station to the certain terminal for a long time even after buffering has been terminated.

In order to avoid the above collision, each of the terminals sets reception timing for a long time, and the PS-Poll may be issued for only the beacon to which the other terminals do not react. As a result, a time during which a receiving unit is activated becomes long, and a power saving efficiency is deteriorated.

Also, in the system having a plurality of base stations using WiFi (802.11), there is no function of allowing the respective base stations operate in synchronization with each other, and the adjacent base stations output signals so as to avoid collision with each other. Even if there arises no problem immediately after the base stations are installed, it is possible that transmission timing is shifted with an elapsed time, and the transmission timing of the adjacent base stations collide with each other. In order to prevent the collision, a high-precision clock is required as a base of the clock generation of the respective base stations.

The present invention has been made in view of the above circumstances, and an object is to provide a wireless communication system and a wireless communication device, in which each terminal can precisely predict a transmission timing of a WiFi beacon issued by each base station, can reduce receiving operation to a minimum time, and can reduce a power consumption.

Solution to Problem

According to the present invention, a DECT communication unit and a WiFi communication unit are both provided in each base station, one of a plurality of base stations is configured as a master base station, a timing of the DECT communication of each base station is synchronized with each other according to a control signal issued by a DECT communication unit in the master base station, and each base station corrects a timer which is a base of clock generation in the WiFi communication unit according to a control signal of the DECT.

With the above configuration, a beacon transmission timing of the WiFi communication unit in each base station is controlled according to a control signal issued by the DECT communication unit of the master base station. This prevents the WiFi transmission timing of each base station from colliding with each other by shifting the transmission timing with an elapsed time. Each terminal can precisely grasp the transmission timing of the WiFi beacon by information included in the control signal of the DECT from the base station. Each terminal can be activated at timing when the terminal can receive the WiFi beacon from the base station. As a result, useless receiving operation is not conducted.

Advantageous Effects of Invention

According to the wireless communication system of the present invention, each terminal can precisely predict the transmission timing of the WiFi beacon issued by each base station, can reduce the receiving operation to a minimum time as required, and can reduce the power consumption.

BRIEF DESCRIPTION OF DRAWINGS

FIG. 14 is a diagram illustrating an example of transmission timing of each signal in the wireless communication system.

DESCRIPTION OF EMBODIMENTS

In order to solve the above problems, according to the present invention, there is provided a wireless communication system that conducts a communication between a base station and a terminal, in which the base station includes a first communication unit using a first communication system of a TDMA system, and a second communication unit using a second communication system, the terminal includes a third communication unit using the first communication system of the TDMA system, and a fourth communication unit using the second communication system, the base station transmits a control signal in the first communication system with the use of the first communication unit, and determines timing of transmission by the second communication unit according to timing of TDMA of the first communication unit, the third communication unit of the terminal receives the control signal transmitted from the base station in the first communication system, and the fourth communication unit controls receiving operation according to information included in the control signal transmitted in the first communication system.

Also, in a system in which a plurality of base stations functions in cooperation with each other, a base station set as a master in a plurality of base stations transmits a control signal in a first communication system, base stations that are slaves conduct a communication of the first communication system in synchronization with the control signal, each of the base stations transmits a control signal of the first communication system with the first communication unit, and determines timing of transmission by the second communication unit according to timing of TDMA of the first communication unit, the third communication unit of the terminal receives the control signal transmitted from the base station in the first communication system, and the fourth communication unit controls receiving operation according to information included in the control signal transmitted in the first communication system.

Also, in the wireless communication system according to the present invention, in addition to the above-mentioned configuration, the first communication unit of the base station detects a channel having a possibility of an interference according to an electric field intensity of a signal received from other surrounding base stations, and notifies the second communication unit of information indicative of the channel, and the second communication unit prevents the notified channel from being used as a use prohibition channel under a control.

Also, in the wireless communication system according to the present invention, in addition to the above-mentioned configuration, the second communication system is set as a WiFi communication system, and the fourth communication unit of the terminal is activated at a beacon timing of a wireless LAN transmitted by the base station.

First Embodiment

Figure 1:
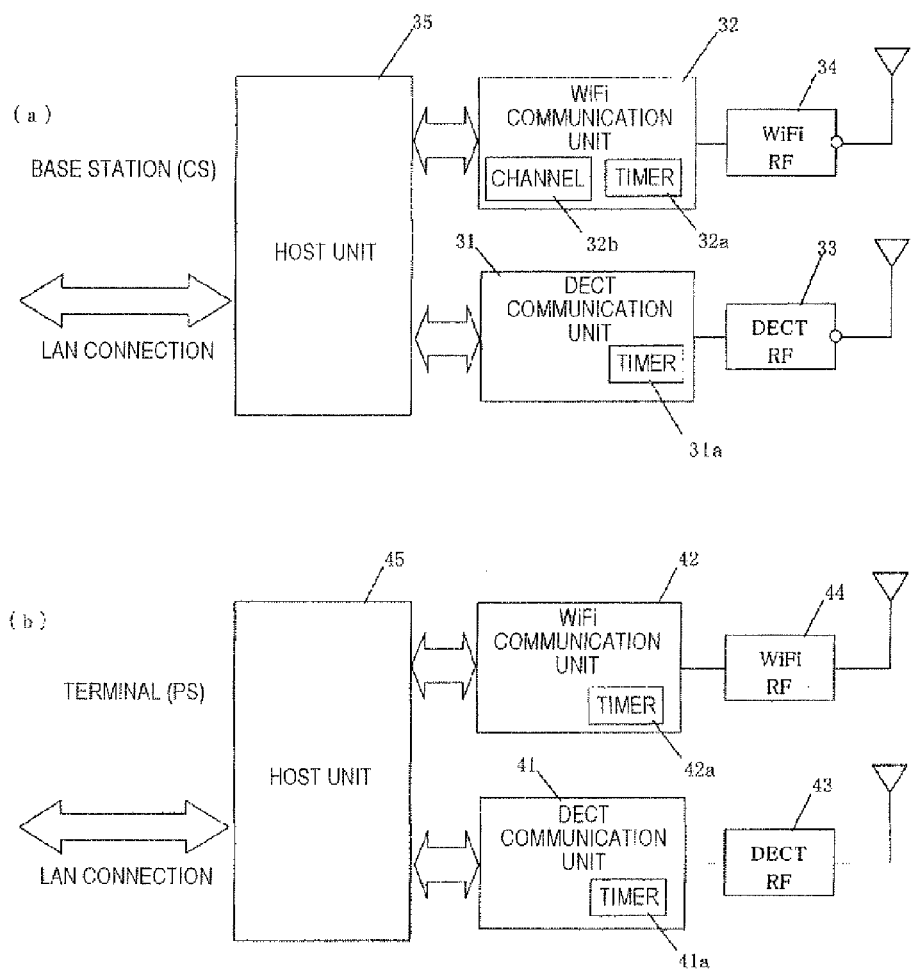
In FIG. 1, (a) and (b) are block diagrams of a wireless base station and a wireless terminal in a wireless communication system according to an embodiment of the present invention.
Figure 2:
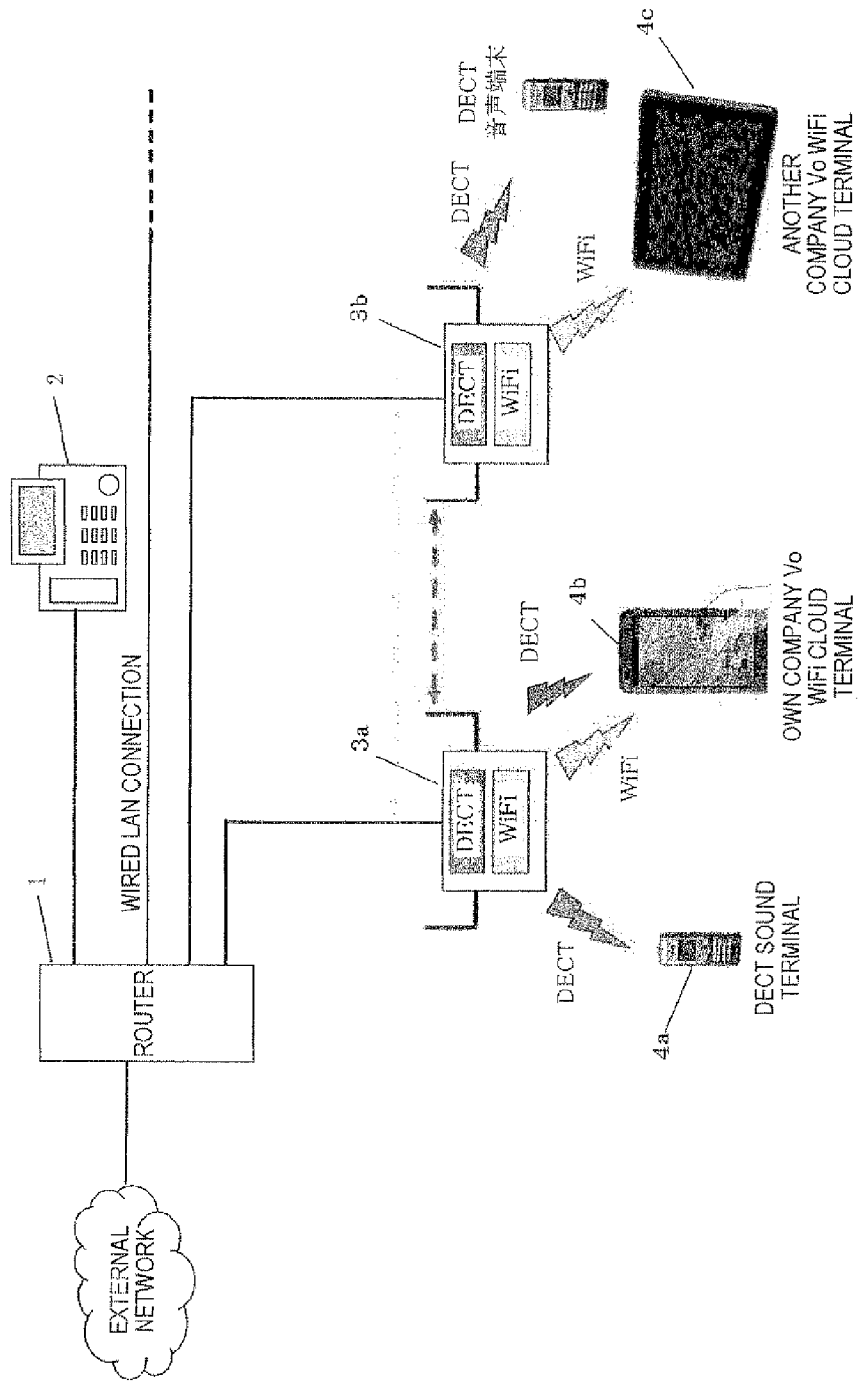
FIG. 2 is a diagram illustrating a wireless communication system according to the embodiment of the present invention.

FIG. 2 is a diagram illustrating a configuration of a wireless communication system according to an embodiment of the present invention. In FIG. 1, (a) and (b) are block diagrams of a wireless base station and a wireless terminal in the wireless communication system. Referring to FIG. 2, reference numeral 1 denotes a router for configuring a LAN connection, reference numeral 2 is an extension telephone to which the LAN connection is enabled, reference numeral 3a and 3b are wireless base stations (base stations), and reference numeral 4a, 4b, and 4c are wireless terminals (terminals). The router 1 includes a WAN connection port for connection to a WAN side of an external, and a LAN connection port that connects the respective terminal devices on a LAN (local area network) side. The router 1 manages routing of mutual signal packets of the extension telephone 2 and the respective base stations (base stations 3a, 3b, etc.), and local IP addresses.

The wireless base stations 3 (3a, 3b, etc.) includes a DECT communication unit that conducts a communication by a DECT system, and a WiFi communication unit that conducts a communication by a WiFi system. The wireless terminals 4 (4a, 4b, 4c, etc.) also each include a DECT communication unit that conducts a communication by the DECT system, and a WiFi communication unit that conducts a communication by the WiFi system.

Subsequently, a configuration of the base stations 3 will be described. FIGS. 1(a) and 1(b) illustrate configurations of the wireless base stations 3 (hereinafter referred to as "base stations 3"), and the wireless terminals 4 (hereinafter referred to as "terminals 4"), which are constituent elements of the wireless communication system according to the embodiment of the present invention. Referring to FIG. 1(a), each of the base stations 3 includes both of the wireless communication system using the DECT system, and an access point function that conducts a communication through a WiFi (802.11).

Referring to FIG. 1(a), reference numeral 31 denotes a DECT communication unit that conducts a communication by the DECT system, and reference numeral 32 is a WiFi communication unit that conducts a communication by the WiFi system. Reference numeral 33 denotes a wireless communication circuit (DECT-RF) for DECT communication, and reference numeral 34 is a wireless communication circuit (WiFi-RF) for WiFi communication. Reference numeral 35 denotes a base station host unit (merely called "host unit" in FIG. 1(a)) that assigns data to be communicated to a communication channel of the DECT system, and a communication channel of the WiFi system, and also controls transmission and reception timing of those communication channels. The base station host unit 35 of the wireless base stations 3 delivers, if a signal of a sound channel transmitted from the other base stations 3 or the extension telephone through a wired LAN is addressed to the terminal 4, the signal to the DECT communication unit 31, and transmits a signal of the sound channel transmitted through the DECT communication unit 31 to the other base stations 3 or the extension telephone through the wired LAN. Also, the base station host unit 35 of the base stations 3 delivers, if a signal of a data channel transmitted from the other base stations 3 or the extension telephone through the wired LAN is addressed to the terminal 4, the signal to the WiFi communication unit 32, and transmits a signal of the data channel transmitted through the WiFi communication unit 32 to the other base stations 3 or the extension telephone through the wired LAN. In the wireless communication system according to this embodiment, the plurality of base stations 3 is installed on a wall or a hallway of an office, and those base stations 3 communicate directly with the respective terminals 4 by the DECT system and the Win system.

The DECT scheduled to be used in Japan employs a TDMA/TDD system including 24 slots (12 uplink slots and 12 downlink slots) in one frame of a 10 ms cycle, using the frequency band of 1893.5 MHz to 1906.1 MHz. Also, the DECT includes at least one control channel slot, and the control channel and call channels are transmitted and received in a frame cycle of 10 ms. Also, the respective frequencies and slot positions are arbitrary, and five frequencies are prospected to be assigned as the frequency.

Figure 3:
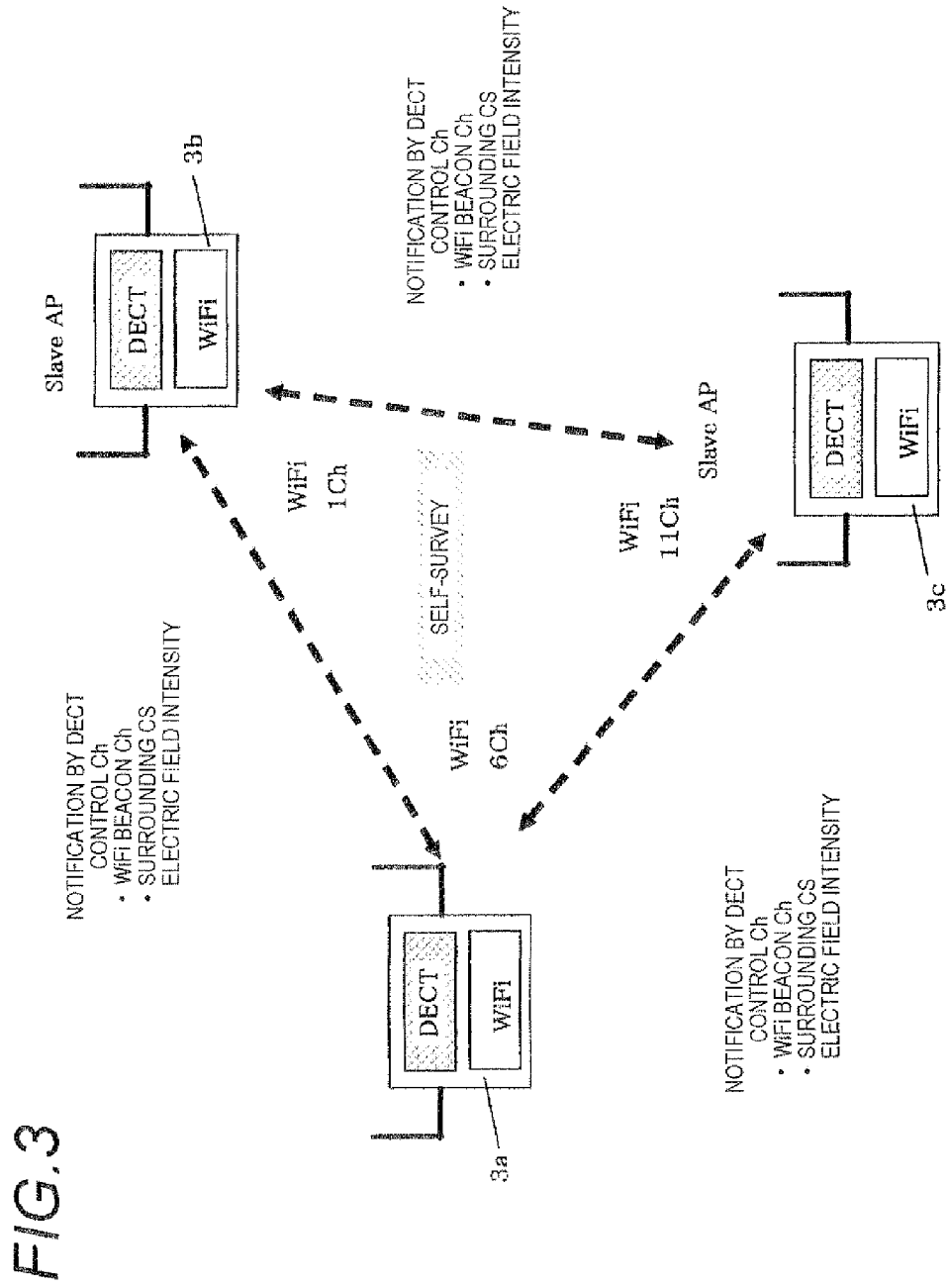
FIG. 3 is an illustrative view illustrating cooperating operation of a plurality of base stations in the wireless communication system.

As illustrated in FIG. 3, at least one of the plurality of base stations 3 is set as a master base station 3a. When the master base station 3a set as the master is powered on, it is determined whether the base stations 3b and 3c set as slaves are connected to the wired LAN under the router 1 connected to the master base station 3a, or not if the master base station 3a determines that the slave base stations 3b and 3c are connected to the same wired LAN, a model code (model code indicative of the DECT system) of the master base station 3a per se is transmitted to local IP addresses of the respective slave base stations 3b and 3c. Also, the master base station 3a requests the respective slave base stations 3b and 3c to transmit the local IP addresses and the model codes. When those information is transmitted from the respective slave base stations 3b and 3c to the master base station 3a, the master base station 3a registers the respective model codes (model codes indicative of the DECT system) in association with the local IP addresses of the respective slave base stations 3b and 3c in an internal memory. Also, when the local IP address and the model code of the master base station 3a are transmitted from the master base station 3a to the slave base stations 3b and 3c, the respective slave base stations 3b and 3c registers those information in an internal memory.

The master base station 3a is a standard for timing synchronization of TDMA/TDD used by the respective other base stations 3 in a communication of the DECT system. The respective slave base stations 3b and 3c receive a control signal transmitted by the master base station 3a, and determine transmission and reception timing of their TDMA/TDD according to that timing.

Also, the wireless communication system using the DECT communication has a neighbor installation function. The neighbor installation function has a function that the individual base stations 3 each detect the presence of the other surrounding base stations 3, measure a wireless distance to each of the base stations 3 according to an electric field intensity of a signal received from the base station 3, and the respective base stations 3 each grasp an installation status and an operation status of the adjacent base station 3 on the basis of those information. In this embodiment, there is provided a function (self-survey) that the respective base stations 3 share a state of the channel used for the WiFi communication with the use of the neighbor installation function, and avoid the use of the channel having the possibility of an interference. This function will be described in detail later.

Figure 4:
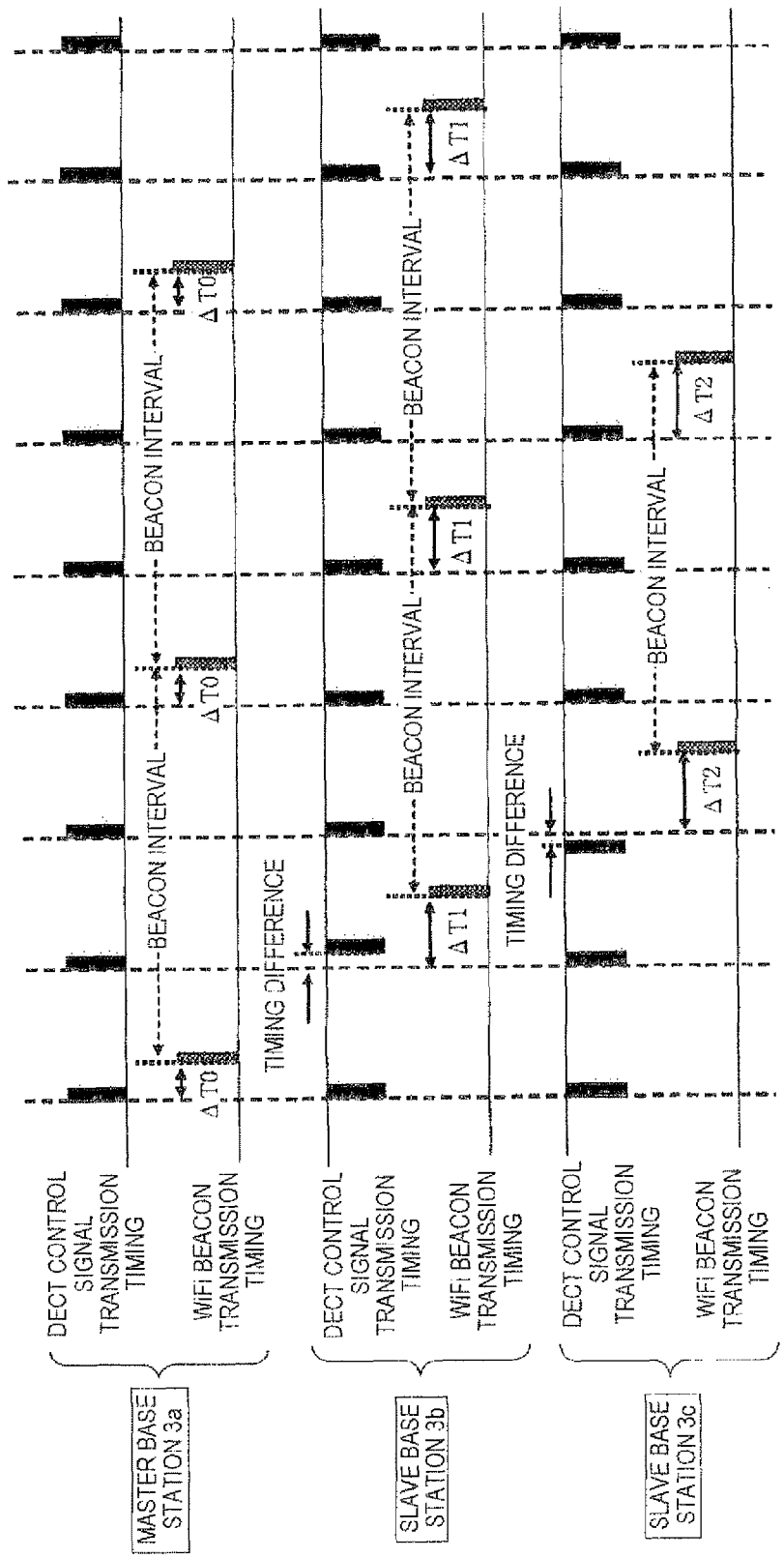
FIG. 4 is a timing chart illustrating a condition in which a master base station and a slave base station synchronize with each other in the wireless communication system.

FIG. 4 is a system synchronization timing chart illustrating a condition for synchronizing the master base station 3a with the respective other slave base stations 3b and 3c. FIG. 4 illustrates a DECT control signal transmission timing of the master base station 3a, a WiFi beacon transmission timing of the master base station 3a, a DECT control signal reception timing of the slave base station 3b, a WiFi beacon transmission timing of the slave base station 3b, a DECT control signal reception timing of the slave base station 3c, and a WiFi beacon transmission timing of the slave base station 3c in order from above.

In the DECT, one slot is assigned to the control channel in one frame of a 10 ms cycle, and as illustrated in FIG. 4, a DECT communication unit 31 of the master base station 3a transmits a DECT control signal in the 10 ms cycle. The transmission and reception timing used in the WiFi communication by the respective base stations 3 is set to transmit a WiFi beacon at beacon intervals which are an integral multiple of one frame cycle (10 ms) of the DECT. A time difference between the WiFi beacon and the latest DECT control signal is set to a value different for each of the base stations 3. In an example of FIG. 4, the master base station 3a transmits the WiFi beacon at a time position advanced by a time difference ATO from the DECT control signal transmission. The time difference between the WiFi beacon of the respective other base stations 3 and the latest DECT control signal is determined by the master base station 3a, and transmitted from the master base station 3a to the respective other base stations 3 through the wired LAN. In the example of FIG. 4, a time difference for determining the beacon transmission timing used in the WiFi communication of the slave base station 3b is ΔT1, and a time difference for determining the beacon transmission timing used in the Win communication of the slave base station 3c is ΔT2. Those time differences ΔT0, ΔT1, and ΔT2 are changed for each of the base stations 3 so that the beacon transmission timings of the respective base stations 3 do not overlap with each other.

The DECT communication units 31 of the slave base station 3b and the slave base station 3c each always receive the DECT control signal issued by the master base station 3a. At a certain time, when it is detected that the DECT control signal reception timing of the slave base station 3b is somewhat delayed with respect to the DECT control signal timing issued by the master base station 3a, the DECT communication unit 31 of the slave base station 3b conducts a correction that the delayed timing difference is subtracted from the self-timer so that the subsequent reception timing matches the DECT control signal timing. Also, at a certain time, when it is detected that the DECT control signal reception timing of the slave base station 3c is somewhat advanced with respect to the DECT control signal timing issued by the master base station 3a, the DECT communication unit 31 of the slave base station 3b conducts a correction that the advanced timing difference is added to the self-timer so that the subsequent reception timing matches the DECT control signal timing.

Thus, a difference between the beacon transmission timing used in the WiFi communication by the respective slave base station 3c and the reception timing of the DECT control signal is fixed under the control of the master base station 3a (time difference of the master base station 3a: ΔT0, time difference of the slave base station 3b: ΔT1, time difference of the slave base station 3c: ΔT2). Further, the reception timing of the DECT control signal of the respective base stations 3 is synchronized with the master base station 3a. Therefore, the beacon transmission timing of the wireless LAN of the respective slave base stations 3b and 3c is always controlled at timing of the master base station 3a.

As described above, the DECT communication unit 31 of the master base station 3a in the base stations 3 transmits the DECT control signal with the use of the wireless frame synchronizing signal created according to the self-timer. As described above, the DECT communication unit 31 of the slave base stations 3b and 3c transmit the DECT control signal with the use of the wireless frame synchronizing signal that has been corrected on the basis of the signal from the master base station 3a using the function of the air synchronization of the DECT. Further, the respective base stations 3 corrects a WiFi timer on the basis of the timing of the DECT to realize synchronization of the respective base stations 3 even in the WiFi communication. As a result, even if the clock of the WiFi communication unit 32 somewhat surges, the respective base stations 3 transmit the beacon synchronized at a precise timing obtained by DECT wireless synchronization, and the terminal (PS) 4 can receive the beacon of the WiFi without conducting useless receiving operation. A communication between the base stations 3 and the terminals 4 will be described in detail later.

Subsequently, a configuration of the terminals 4 will be described. Referring to FIG. 1(b), the wireless terminal (hereinafter referred to as "terminal") 4 which is a constituent element of the wireless communication system according to the embodiment of the present invention has both communication functions of the DECT system and the WiFi system as with the base stations 3. Reference numeral 41 denotes a DECT communication unit that conducts a communication by the DECT system, and reference numeral 42 is a WiFi communication unit that conducts a communication by the WiFi system. Reference numeral 43 is a wireless communication circuit (DECT-RF) for the DECT communication, and reference numeral 44 is a wireless communication circuit (WiFi-RF) for the WiFi communication. Reference numeral 45 denotes a terminal host unit (merely called "host unit" in FIG. 1(b)) that controls a communication channel of the DECT system, a communication control of the WiFi system, and the transmission and reception timing.

The DECT communication unit 31 conducts encoding for error detection, simple privacy processing, and scramble processing for a transmission wireless channel, and error detection, syncword, detection, descramble processing, and detection of a wireless frame timing of the received signal for the received wireless channel.

Figure 5:
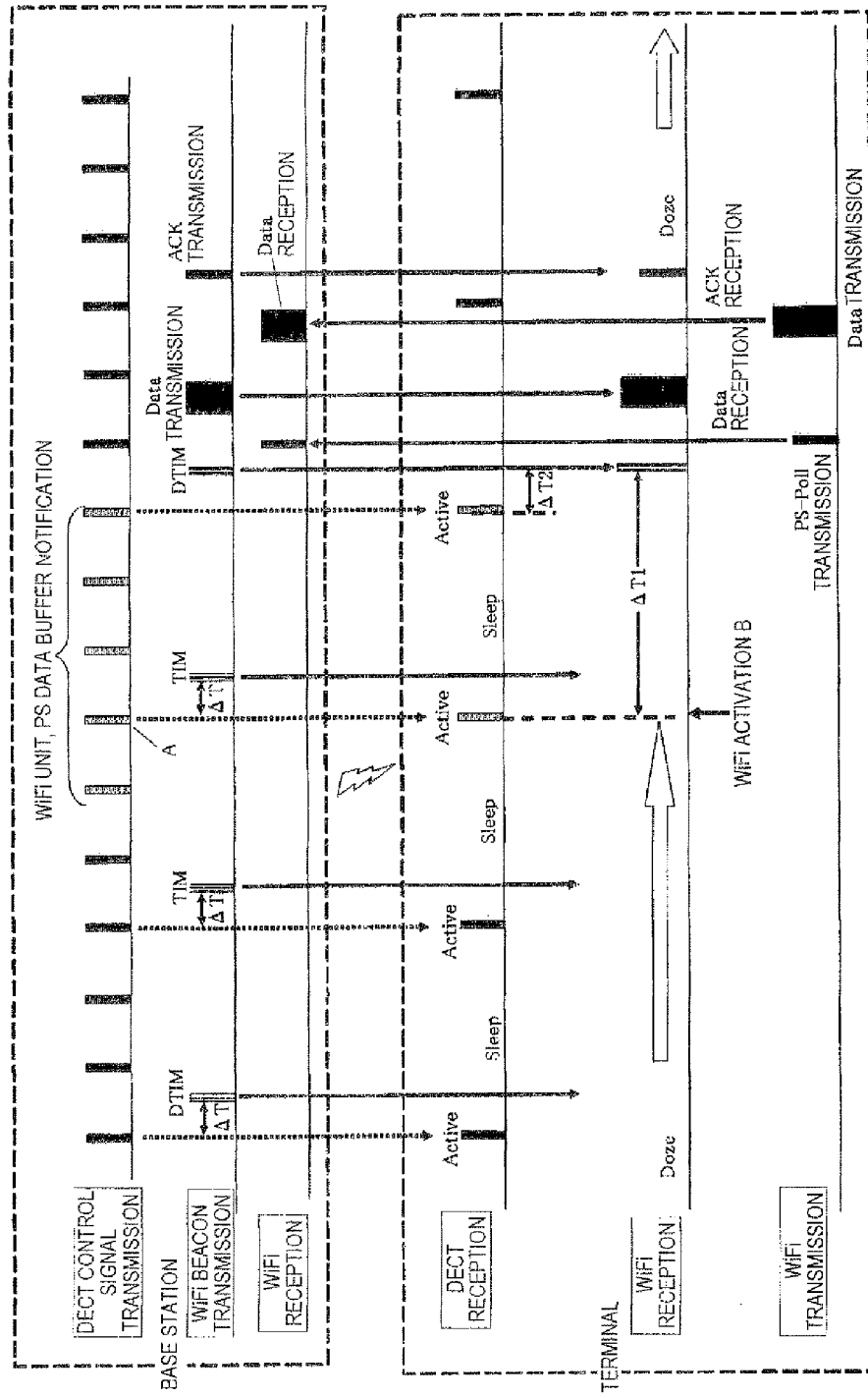
FIG. 5 is a timing chart illustrating a timing when the terminal that communicates with the base station receives a DECT control signal and a WiFi signal from the base station in the wireless communication system.

Subsequently, a communication of the DECT system between the terminals 4 and the base stations 3 will be described. FIG. 5 illustrates timing when each of the terminals 4 that communicates with the base station 3 receives the DECT control signal and the WiFi signal from the base station 3. FIG. 5 illustrates transmission timing of the DECT control signal of the base station 3 (3a, 3b, 3c), WiFi beacon transmission timing of the base station 3, and timing at which the base station 3 receives the WiFi signal from the terminal in order from above. Also, a lower portion of FIG. 5 illustrates timing at which the terminal 4 (4a, 4b) receives the DECT control signal from the base station 3, timing at which the terminal 4 receives the WiFi signal from the base station 3, and timing at which the terminal 4 transmits the WiFi signal to the base station 3.

As described above, the timing at which the base stations 3 transmits the WiFi beacon is synchronized with the DECT control signal, and in an example of FIG. 5, the base station 3 transmits the WiFi beacon (DTIM, TIM) at a time position advanced by a time difference ΔT0 from the DECT control signal transmission. When the WiFi communication unit 32 holds data scheduled to be transmitted to the terminal 4 within a buffer, the WiFi communication unit 32 transmits a notification indicating that the data addressed to the terminal 4 is held within the buffer, and ID information indicative of the destination terminal 4 together with the DTIM information in the WiFi beacon.

In order to avoid the collision and suppress the power consumption, the WiFi communication unit 42 of the terminal 4 dozes in a period when a communication is unnecessary. The WiFi communication unit 42 is activated according to an instruction from the host unit 45, and conducts the operation of receiving the WiFi signal. When the WiFi communication unit 42 of the terminal 4 is activated, the WiFi communication unit 42 receives the WiFi beacon transmitted from the WiFi communication unit 32 of the base station 3. The terminal 4 receives the WiFi beacon, and discriminates whether data scheduled to be transmitted to the subject terminal 4 is present in the base station 3, or not, if the TIM information is present. If it is determined that data addressed to the subject terminal 4 is not present in the base station 3 (or buffering for transmission preparation has not been completed), transmission of PS-Poll is not conducted.

Thereafter, when the terminal 4 that has received the WiFi beacon determines from the DTIM information in the WiFi beacon that data for broadcast is present in the base station 3, and buffering for transmission preparation has been completed, the terminal 4 transmits PS-Poll to the base station 3. When receiving PS-Poll from the terminal 4, the WiFi communication unit 32 of the base station 3 extracts the data scheduled to be transmitted to the terminal 4 to which the PS-Poll is transmitted from the buffer, and transmits data to the terminal 4. The terminal 4 that has transmitted PS-Poll receives data addressed to the subject terminal 4 transmitted from the base station 3. Also, if there is data addressed to the other terminal 4 from the subject terminal 4, or data scheduled to be transmitted through an external network, the terminal 4 transmits the data to the base station 3. Upon completion of transmitting and receiving the data, the base station 3 transmits an ACK signal meaning that data received has been completed to the terminal 4, and the subject terminal 4 receives the ACK signal, and then suspends the operation of the WiFi communication unit 42, and returns to a doze state.

Subsequently, a description will be given of the operation for allowing the base station 3 to activate the WiFi communication unit 42 of a target terminal when there is data scheduled to be transmitted from the base station 3 to the terminal 4. In the base station 3, when the WiFi communication unit 32 thereof holds the data scheduled to be transmitted to the terminal 4 in the buffer, the base station host unit 35 of the base station 3 transmits this fact to the DECT communication unit 31. According to an instruction from the base station host unit 35, the DECT communication unit 31 transmits a notification indicating that the data addressed to the terminal 4 is held within the buffer, ID information indicative of the destination terminal 4, and information on a time ΔT1 to the DTIM, together with the DECT control signal (control signal A illustrated in FIG. 5) to be transmitted.

As illustrated in FIG. 5, the terminal host unit 45 of the terminal 4 activates the WiFi communication unit 42 of the terminal 4 (WiFi activation B illustrated in FIG. 5) immediately when the terminal host unit 45 knows that information indicating that data addressed to the subject terminal 4 is held within the buffer of the base station 3 is present in the DECT control signal (control signal A). As a result, the WiFi communication unit 42 of the terminal 4 that has dozed up to then is activated according to the instruction from the terminal host unit 45, and starts the receiving operation. Thereafter, as in the above description, the terminal 4 receives the WiFi beacon, and transmits PS-Poll to the base station 3. When the base station 3 receives the PS-Poll from the terminal 4, the base station 3 extracts the data scheduled to be transmitted to the terminal 4 from the buffer, and transmits the data to the terminal 4. The terminal 4 that has transmitted the PS-Poll receives the data addressed to the subject terminal 4 which is transmitted from the base station 3. Also, if there is data addressed to the other terminal 4 from the subject terminal 4, or data scheduled to be transmitted through the external network, the terminal 4 transmits the data to the base station 3. Upon completion of transmitting and receiving the data, the base station 3 transmits an ACK signal meaning that data received has been completed to the terminal 4, and the subject terminal 4 receives the ACK signal, and then suspends the operation of the WiFi communication unit 42, and returns to a doze state.

If the received WiFi beacon is indicative of the TIM information, the WiFi communication unit 42 of the terminal 4 does not transmit the PS-Poll, but if the received WiFi beacon is indicative of the DTIM information, the WiFi communication unit 42 transmits the PS-Poll to the base station 3, and the transmission and reception of data start.

In order to avoid collision, when the terminal 4 detects the PS-Poll transmitted by the other terminal 4 before the subject terminal 4 transmits the PS-Poll, the subject terminal 4 ceases the transmission of the PS-Poll thereof. In this case, the subject terminal 4 transmits the PS-Poll once more immediately after having subsequently received the DTIM information in the WiFi beacon, and thereafter receives data transmitted from the base station 3.

Figure 6:
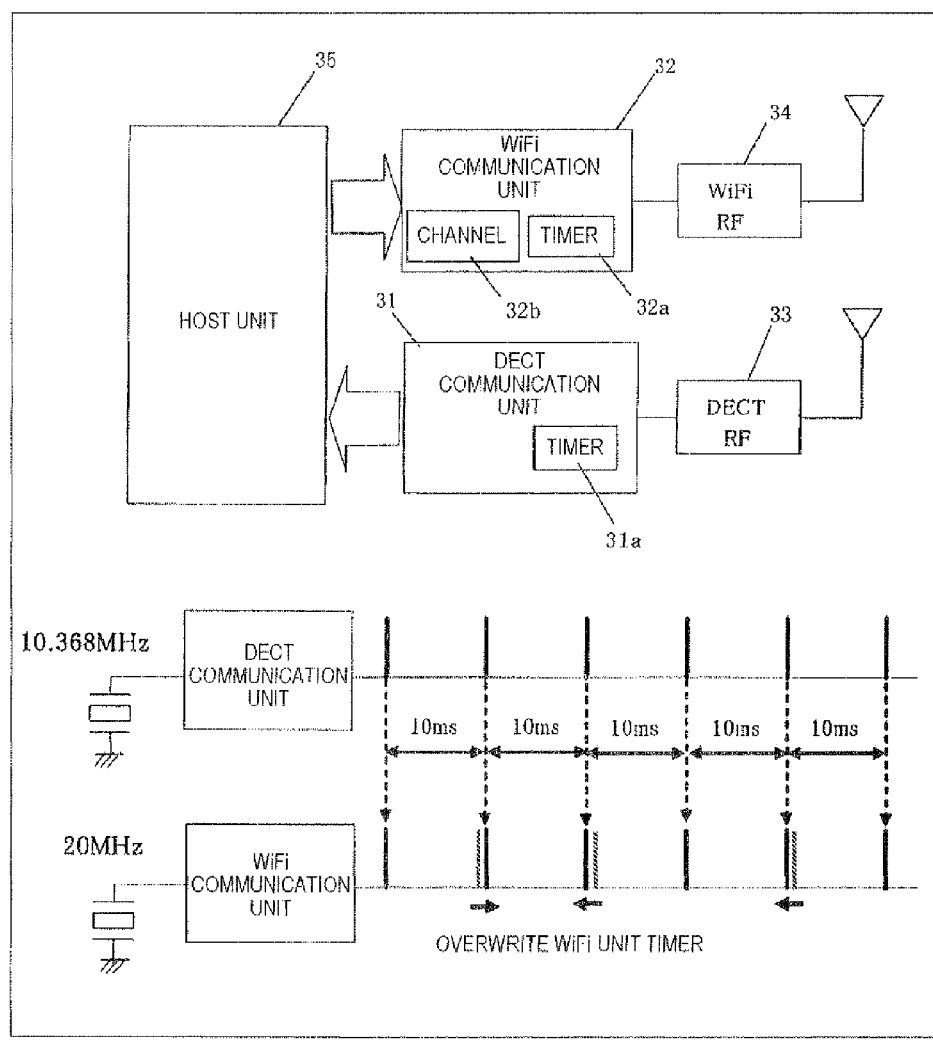
FIG. 6 is an illustrative view illustrating a condition in which the base station corrects a timer of a WiFi communication unit by cyclic interrupt in the wireless communication system.

Hereinafter, a description will be given of correction of a WiFi timer in the system according to the embodiment of the present invention. As illustrated in FIG. 6, the base station host unit 35 of the base station 3 conducts the interrupt of the timer correction on the WiFi communication unit 32 in a 10 ms cycle in which the DECT communication unit 31 of the base station 3 transmits the DECT communication signal. Once in 10 ms, the base station host unit 35 notifies the WiFi communication unit 32 of a correction value generated on the basis of a timer 31a of the DECT communication unit 31, and overwrites the correction value on a value of the WiFi timer to correct the WiFi timer.

Figure 7:
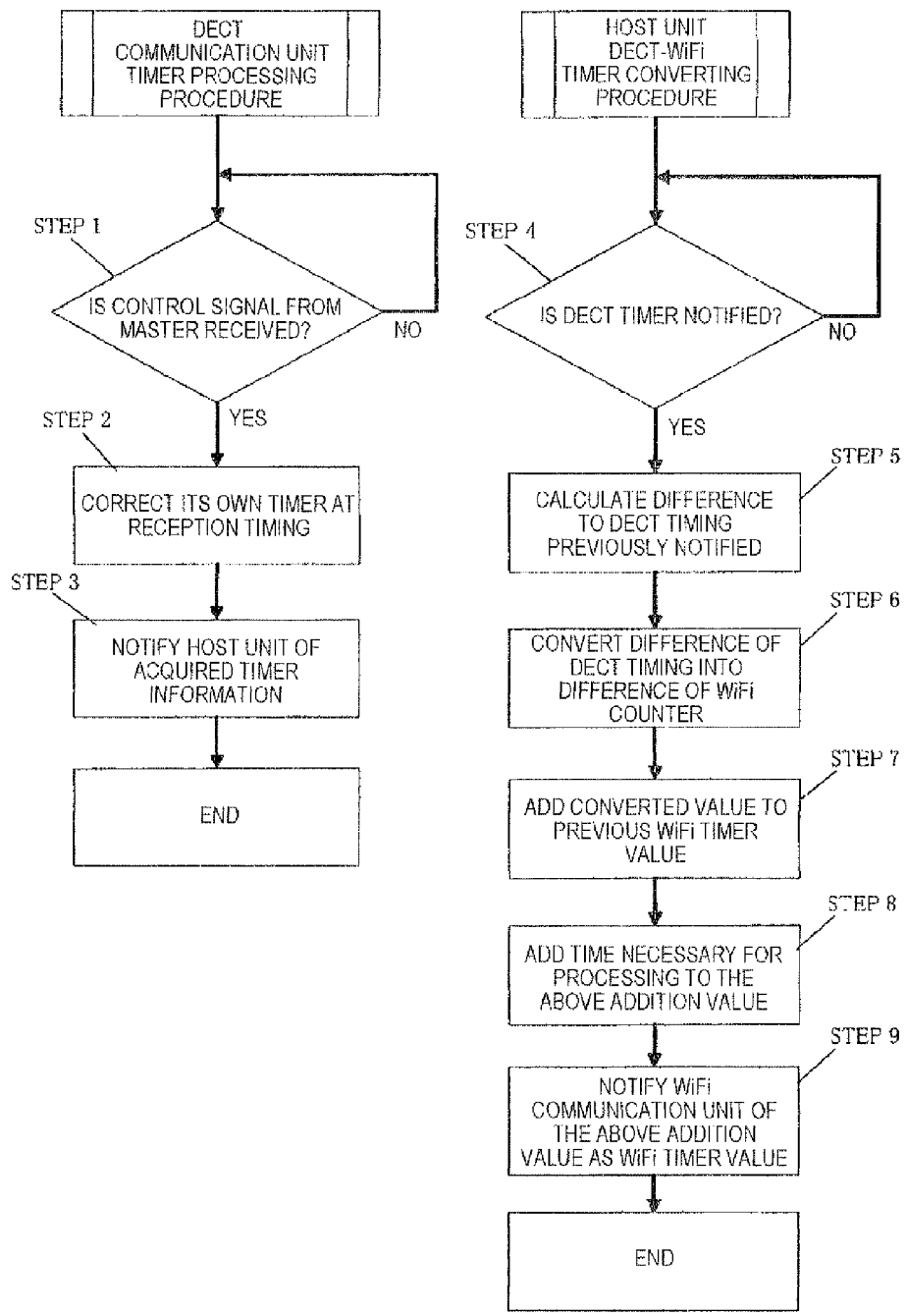
In FIG. 7, (a) and (b) are flowcharts illustrating a timer processing procedure of a DECT communication unit in the base station in the wireless communication system.

FIGS. 7(a) and 7(b) illustrate a timer processing procedure of the DECT communication unit 31 in the slave base stations 3b and 3c, and a DECT-WiFi timer converting procedure of the base station host unit 35. In the timer processing of the DECT communication unit 31 illustrated in FIG. 7(a), when the slave base stations 3b and 3c that conduct the operation of detecting the control signal from the master base station 3a receive the control signal from the master base station 3a (yes in Step 1), the slave base stations 3b and 3c correct the transmission and reception timing of the DECT communication thereof according to the timer signal written in the control signal from the master base station 3a (Step 2). Then, the DECT communication unit 31 of the slave base stations 3b and 3c notifies the base station host unit 35 of the tinier signal acquired from the master base station 3a (Step S3).

FIG. 7(b) illustrates a timer converting procedure of the base station host unit 35 in the slave base stations 3b and 3c. When the timer signal is notified from the DECT communication unit 31 (yes in Step 4), each base station host unit 35 of the slave base stations 3b and 3c calculates a difference from a value of the DECT timer previously notified (Step 5), and converts the obtained difference value into a difference value for correcting the WiFi counter (Step 6). Then, each base station host unit 35 of the slave base stations 3b and 3c then adds the difference value obtained by the DECT timer value acquired at the present time to the previous WiFi tinier value (Step 7). Further, each base station host unit 35 of the slave base stations 3b and 3c adds a time necessary for the communication and the arithmetic processing to the above addition value (Step 8), and notifies the WiFi communication unit 32 of the addition value as a value of the WiFi timer (Step 9).

Figure 8:
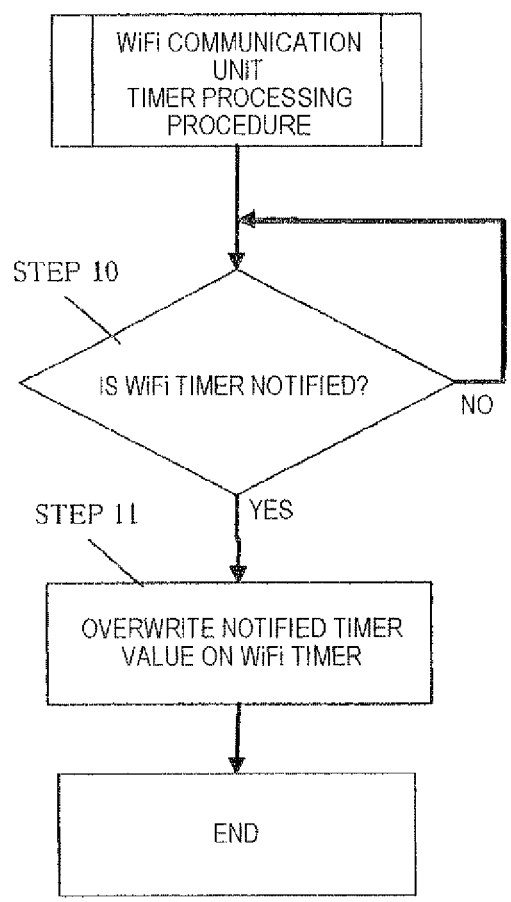
FIG. 8 is a flowchart illustrating a timer conversion procedure of the WiFi communication unit in the base station of the wireless communication system.

FIG. 8 illustrates the timer converting procedure of the WiFi communication unit 32. Referring to FIG. 8, when the Win communication unit 32 is notified, of the value of the WiFi timer from the base station host unit 35 (yes in Step 10), the WiFi communication unit 32 overwrites the notified value of the timer on the value of a tinier 32a (Step 11). Subsequently, the slave base stations 3b and 3c determine the timing of transmitting and receiving the WiFi communication according to a value of the WiFi timer that has been corrected according to the timer signal from the master base station 3a.

Figure 9:
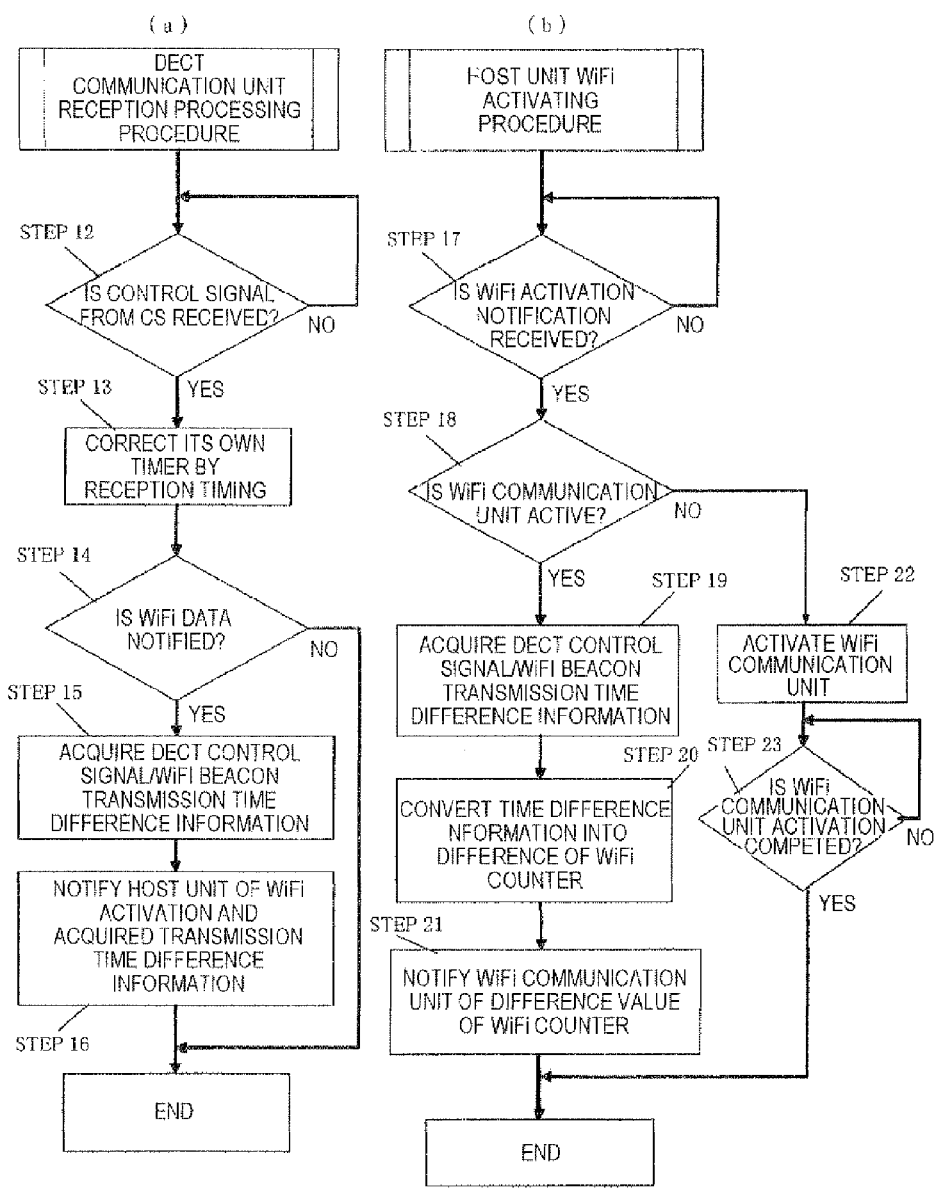
In FIG. 9, (a) and (B) are flowcharts illustrating processing when the WiFi communication is activated in the terminal of the wireless communication system.

FIGS. 9(a) and 9(b) illustrate processing when activating the WiFi communication in the terminal 4. First, in processing when the DECT communication unit 41 of the terminal 4 illustrated in FIG. 9(a) receives the signal from the base station (CS) 3, when the DECT communication unit 41 receives the control signal from the base station 3 (yes in Step 12), the DECT communication unit 41 corrects the transmission and reception timing of the DECT communication thereof according to the timer signal written in the control signal from the base station 3 (Step 13).

Then, the terminal 4 discriminates whether data transmission prepared by WiFi is present, or not, according to the control signal from the base station 3. If it is found that the data transmission prepared by using the WiFi is present in the base station 3 (yes in Step 14), the DECT communication unit 41 of the terminal 4 acquires DECT-WiFi transmission time difference information indicative of a transmission time difference between the DECT control signal and the WiFi beacon from the base station 3 (Step 15). Then, the DECT communication unit 41 instructs the terminal host unit 45 to activate the WiFi communication unit 42, and notifies the terminal host unit 45 of the DECT-WiFi transmission time difference information acquired from the base station 3 (Step 16).

FIG. 9(b) illustrates a procedure when the terminal host unit 45 allows the WiFi communication unit 42 to activate the WiFi communication. When the terminal host unit 45 receives an instruction for activating the WiFi communication unit 42 from the DECT communication unit 41 (yes in Step 17), the terminal host unit 45 checks a state of the WiFi communication unit 42 at that time. If the WiFi communication unit 42 is not activated (active) at that time (no in Step 18), the terminal host unit 45 allows the WiFi communication unit 42 to activate the WiFi communication (Steps 22 and 23), and the WiFi communication unit 42 is activated. If the WiFi communication unit 42 has already been activated when the terminal host unit 45 receives the instruction for activating the WiFi communication unit 42 (yes in Step 18), in order to appropriately set the beacon receiving operation timing of the wireless LAN, the terminal host unit 45 acquires the latest DECT-WiFi transmission time difference information acquired from the base station 3 (Step 19). The terminal host unit 45 converts the obtained time difference information into a difference value for correcting the WiFi counter (Step 20), and notifies the WiFi communication unit 42 of that difference value (Step 21).

Figure 10:
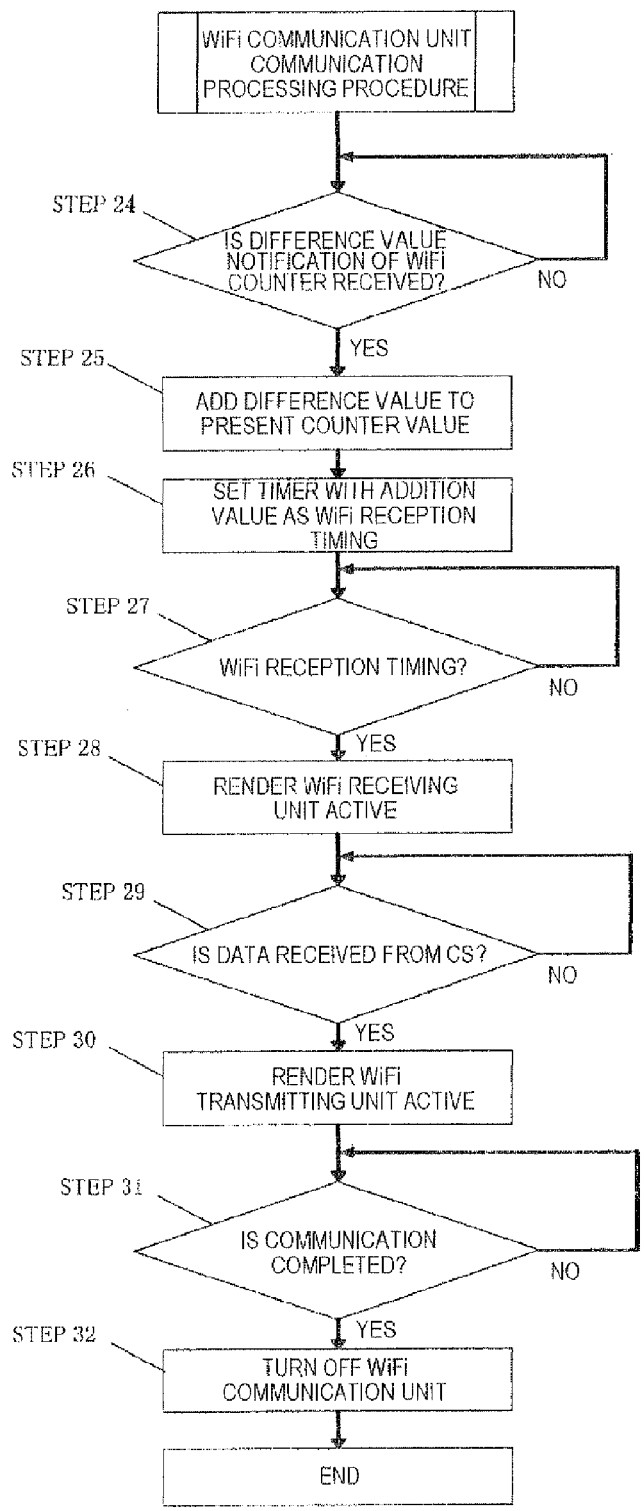
FIG. 10 is a flowchart illustrating a communication processing procedure of the WiFi communication unit in the terminal of the wireless communication system.

FIG. 10 illustrates a communication processing procedure of the WiFi communication unit 42 in the terminal 4. Referring to FIG. 10, when the WiFi communication unit 42 of the terminal 4 receives the difference value notification of the Win counter from the terminal host unit 45 (yes in Step 24), the WiFi communication unit 42 adds the latest difference value received from the terminal host unit 45 to the present counter value to correct the counter value (Step 25). Then, the WiFi communication unit 42 sets the latest counter value for a timer unit 42a of the WiFi communication unit 42 as the WiFi reception timing (Step 20. Subsequently, the terminal 4 monitors the timer unit 42a of the WiFi communication unit 42, and conducts the operation of receiving the WiFi communication every time reaching the reception timing.

The WiFi communication unit 42 of the terminal 4 maintains the doze state when there is no need of communication. In a process of monitoring the timer unit 42a of the WiFi communication unit 42, when reaching the WiFi reception timing (yes in Step 27), the terminal 4 activates the WiFi communication unit 42, and renders a receiving unit active (Step 28). When data such as the WiFi beacon is transmitted from the base station 3 during the WiFi reception timing (Step 29), the terminal 4 receives the data, and transmits the received data to the terminal host unit 45. Also, after having received the data from the base station 3, the terminal 4 renders a transmitting unit of the WiFi communication unit 42 active (Step 30), and transmits the PS-Poll to the base station 3. Thereafter, if there is the data scheduled to be transmitted to the base station 3, the WiFi communication unit 42 of the terminal 4 transmits the data to the base station 3. Upon completion of transmitting and receiving the data with respect to the base station 3, the terminal 4 ceases the operation of the WiFi communication unit 42, and returns to the doze state.

Thus, the plurality of base stations 3 are wirelessly synchronized with each other by the DECT on the basis of the timing of the master base station 3a, and also corrects the WiFi tinier for the WiFi communication with the use of the transmission and reception timing of the DECT synchronous with the master base station 3a. As a result, the transmission and reception timing of the WiFi communication conducted by the plurality of base stations 3 between the respective terminals 4 can be synchronized (WiFi synchronization) between the plurality of base stations 3. The respective terminals 4 can control the operation of the WiFi communication unit 42 at a precise timing obtained by the DECT wireless synchronization. Accordingly, a duration in which the WiFi communication unit 42 of the respective terminals 4 is rendered active can be minimized, to suppress the power consumption of the terminal 4.

Subsequently, a description will be given of a function (self-survey) that the respective base stations 3 voluntarily grasp a state of a channel used in the WiFi communication with the use of the neighbor installation function, and avoid the user of the channel having a possibility of an interference, in detail with reference to FIGS. 11(a), 11(b), and 12.

Figure 11:
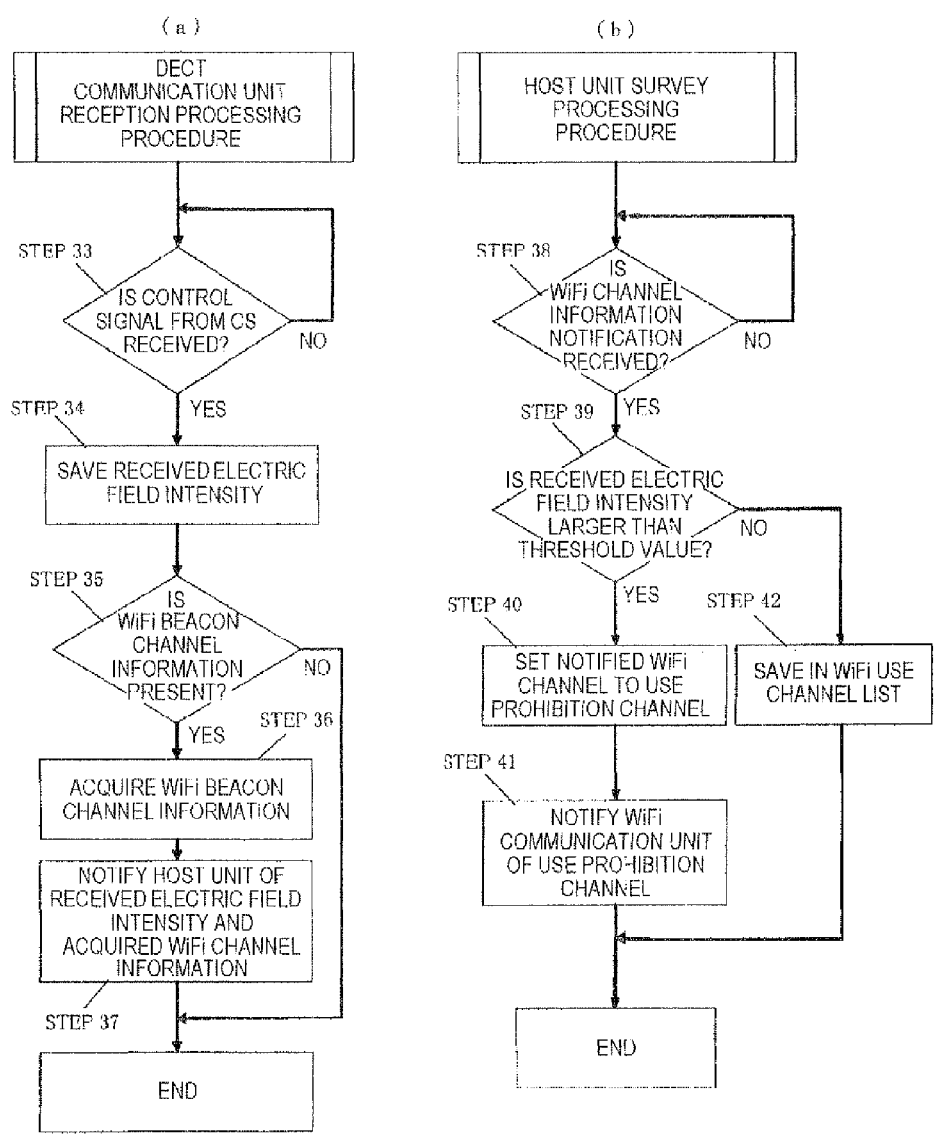
In FIG. 11, (a) and (B) are flowcharts illustrating a self-survey processing procedure that is conducted by the base station in the wireless communication system.

FIG. 11(a) illustrates a procedure of reception processing of the DECT communication unit 31 in the base station 3. Referring to FIG. 11(a), the DECT communication unit 31 of the base station 3 conducts the operation of periodically receiving the control signal of the DECT transmitted by the adjacent other base stations 3. When the DECT communication unit 31 of the base station 3 receives the control signal of the other base station 3 (yes in Step 33), the DECT communication unit 31 of the base station 3 measures an electric field intensity of the reception signal at that time, and saves information on the obtained electric field intensity (Step S34). Also, the DECT communication unit 31 of the base station 3 extracts information on the WiFi communication of the same base station 3 which is embedded in the control signal (yes in Step 35). The information on the WiFi communication includes information indicative of a channel of the WiFi beacon transmitted by the DECT communication unit 31 of that base station 3 therein. When the DECT communication unit 31 of the base station 3 acquires the channel information of the WiFi beacon of the other base station 3 (Step 36), the DECT communication unit 31 of the base station 3 notifies the base station host unit 35 of the base station 3 of the information on the above-mentioned electric field intensity, and the WiFi beacon channel information (Step 37).

FIG. 11(b) illustrates a self-survey processing procedure that is conducted by the base station host unit 35 of the base station 3. Referring to FIG. 11(b), when the base station host unit 35 of the base station 3 receives the WiFi channel information transmitted from the other base station 3 according to the DECT control signal, and the information on the electric field intensity notified from the DECT communication unit 31 together with the WiFi channel information (yes in Step 38), the base station host unit 35 of the base station 3 discriminates whether the electric field intensity corresponding to the Win channel is larger than a predetermined threshold value, not (Step 39).

If the electric field intensity of the DECT control signal of the other base station 3 which is notified from the DECT communication unit 31 is larger than threshold value (yes in Step 39), the base station host unit 35 of the base station 3 sets the WiFi channel as a use prohibition channel to prevent the WiFi channel from being used by the subject base station 3 at that time (Step 40), and notifies the WiFi communication unit 32 of the information on the use prohibition channel (Step 41). Also, if the electric field intensity notified from the DECT communication unit 31 is smaller than the threshold value (no in Step 39), the base station host unit 35 of the base station 3 considers the WiFi channel to be available at that time, and saves the information on the channel in a WiFi available channel list (Step 42).

Figure 12:
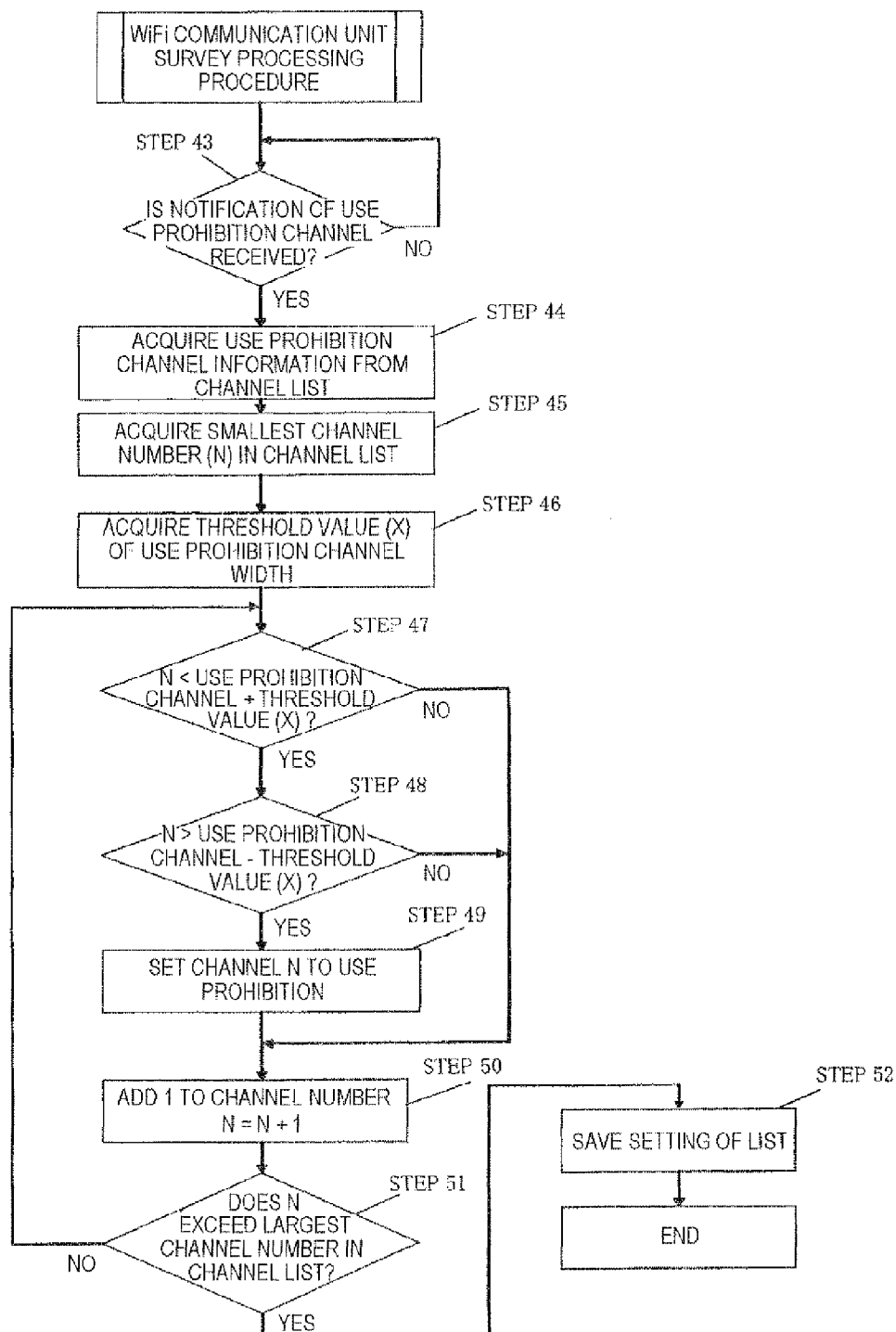
FIG. 12 is a flowchart illustrating a self-survey processing procedure that is conducted by the WiFi communication unit in the base station of the wireless communication system.

FIG. 12 illustrates the self-survey processing procedure that is conducted by the WiFi communication unit 32 of the base station 3. Referring to FIG. 12, when the WiFi communication unit 32 of the base station 3 receives the use prohibition channel from the base station host unit 35 (yes in Step 43), the WiFi communication unit 32 of the base station 3 updates a channel list 32b (merely called "channel" in FIG. 12) in the WiFi communication unit 32.

In the self-survey processing that is conducted by the WiFi communication unit 32 of the base station 3 according to this embodiment, when the WiFi communication unit 32 of the base station 3 receives the information on one use prohibition channel, the DECT communication unit 31 of the base station 3 sets several channels having higher frequencies centering on the channel notified as the use prohibition, and several channels having lower frequencies centering on that notified channel, as use prohibition. Hereinafter, it is assumed that the number of channels determined as the use prohibition which are higher or lower in the frequency than the channel notified as the use prohibition is a threshold value (X) of the use prohibition channel width. The threshold value (X) of the use prohibition channel width does not need to be fixed, but may be changed according to a variety of conditions, and the latest threshold value (X) is held in the memory of the WiFi communication unit 32.

Hereinafter, a description will be given of a step of checking whether the respective channels in the channel list 32b are included in the threshold value (X) set as the use prohibition centering around the channels notified as the use prohibition, or not. The WiFi communication unit 32 extracts the information on the channels set as the use prohibition from the channel list 32b (Step 44), acquires a channel number (N) smallest in the channel list (Step 45), and further acquires the threshold value (X) of the use prohibition channel width (Step 46). Then, in Step 47, the WiFi communication unit 32 checks whether the extracted channel number (N) is smaller than a number obtained by adding the threshold value (X) to the channel number notified as the use prohibition from the base station host unit 35. If the channel number (N) is smaller than the number obtained by adding the threshold value (X) to the channel number notified from the base station host unit 35 (yes in Step 47), the WiFi communication unit 32 checks whether the extracted channel number (N) is larger than a number obtained by subtracting the threshold value (X) from the channel number notified as the use prohibition from the base station host unit 35 in subsequent Step 48. If the channel number (N) is larger (yes in Step 48), the WiFi communication unit 32 determines that the channel number (N) at that time is included in the use prohibition channel width, and set as the use prohibition (Step 49).

On the other hand, in Step 47, if the extracted channel number (N) is larger than the number obtained by adding the threshold value (X) to the channel number notified as the use prohibition from the base station host unit 35 (no in Step 47), or if the extracted channel number (N) is smaller than the number obtained by subtracting the threshold value (X) from the channel number notified as the use prohibition from the base station host unit 35 (no in Step 48), it is determined that the channel number (N) at that time is available.

Then, the WiFi communication unit 32 adds 1 to the channel number (Step 50) if the number (N) obtained by adding 1 in the previous step exceeds the largest number of the channel list 32b (yes in Step 51), the WiFi communication unit 32 saves the setting of the list assuming that processing on all of the channels has been completed (Step 52). If the channel number (N) does not exceed the largest number of the channel list 32b (no in Step 51), the WiFi communication unit 32 repeats Step 47, Step 48, Step 49, and Step 50, and determines whether all of the channels are included in the use prohibition channel width, or not. Thus, in the channel list 32b of the WiFi communication unit 32 in the base station 3, the channel notified as the use prohibition, and the channels falling within a range of the threshold value (X) from that channel are set as the use prohibition, and updated every time there is a channel newly notified as the use prohibition.

As described above, the use prohibition channel information can be obtained from the distance to the adjacent base station acquired through the DECT, and a transmission electric power of the WiFi communication unit 32 in the base station 3 can be suppressed.

Second Embodiment

Subsequently, an example in which the power consumption can be further suppressed in the terminal 4 will be described.

As described above, the WiFi communication unit 42 of the terminal 4 does not operate when there is no need of the communication, and maintains the doze state. Also, the DECT communication unit 41 of the terminal 4 usually receives all of the control signals from the base station 3, and can treat with the reception/transmission. If possible, the terminal 4 allows receiving of the control signal to periodically sleep even in the DECT communication, thereby being capable of further suppressing the power consumption in the terminal 4.

However, if the receiving of the DECT control signal sleeps for a long time, a deviation (timing error) between the transmission and reception timing of the terminal 4 and the timing of the base station 3 becomes larger. Therefore, in order that the terminal 4 surely receives the signals without missing the WiFi beacon, there is a need to increase a size of a reception time window for receiving the WiFi beacon as large as the timing error can be absorbed. The effect of the power consumption of the terminal 4 is vitiated as much.

According to this embodiment, in order that the base station host unit 35 of the base station 3 regularly synchronizes the timing of the WiFi communication unit 32 with the timing of the DECT communication unit 31 within the same base station 3, the base station 3 transmits the timing signal to the WiFi communication unit 32 at a DECT-Dummy prepared for the control signal transmission of the DECT, and determines the transmission timing of the WiFi beacon transmitted by the WiFi communication unit 32. The DECT control signal is not transmitted every time at the timing of the DECT-Dummy, but the DECT control signal is transmitted from the base station 3 in a cycle which is an integral multiple of 10 ms. In order to suppress the power consumption, the DECT communication unit 41 of the terminal 4 conducts the receiving operation at a timing when the base station 3 transmits the DECT control signal.

Figure 13:
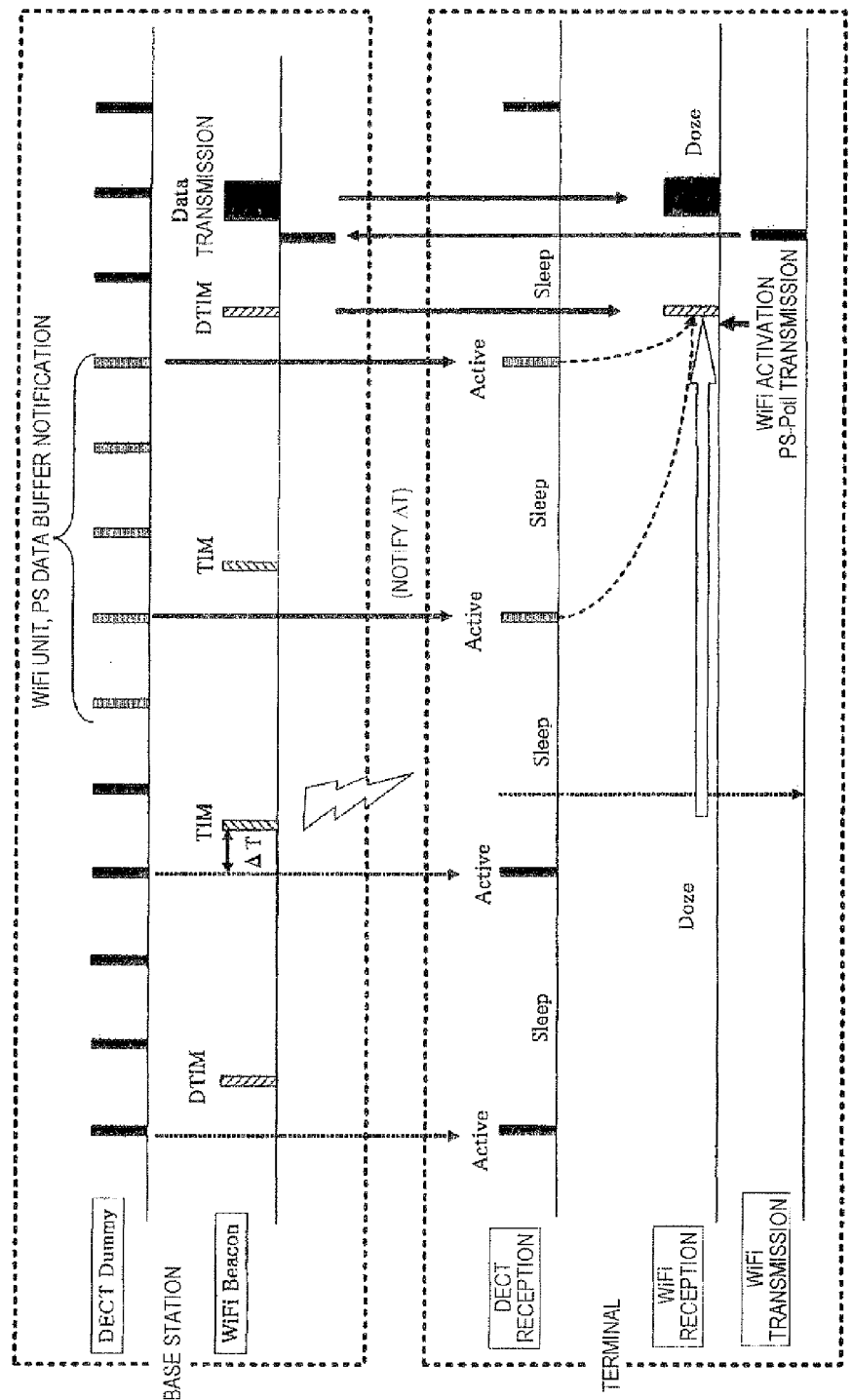
FIG. 13 is a timing chart illustrating an example in which the WiFi communication unit is activated at timing when DTIM information is transmitted in the terminal of the wireless communication system.

In the example of FIG. 5, the base station 3 includes the information indicating that the data addressed to the terminal 4 is held within the buffer in the control signal of the DECT. At a time point when the terminal 4 is notified of information indicative of this fact according to the control signal of the DECT, the WiFi communication unit 42 is rendered active. However, data is actually transmitted from the base station 3 to the terminal 4 after the DTIM information has been transmitted to the terminal 4 by the WiFi beacon indicating that the data of the broadcast is present in the base station 3. The terminal 4 can reception data from the base station 3 if the terminal 4 can normally receive the DTIM information. Therefore, there is no need to render the WiFi communication unit 42 active immediately before the DTIM information is transmitted. FIG. 13 illustrates an example in which the WiFi communication unit 42 of the terminal 4 is activated at timing when the DTIM information is transmitted.

FIG. 13 illustrates timing of the DECT-Dummy of the base station 3, and transmission timing of the WiFi beacon of the base station 3 in order from above. Also, a lower portion of FIG. 13 illustrates timing when the terminal 4 receives the DECT control signal from the base station 3, timing when the terminal 4 receives the WiFi signal from the base station 3, and timing when the terminal 4 transmits the WiFi signal to the base station 3. The base station 3 transmits information on the time difference ΔT to the WiFi beacon transmitted by the WiFi communication unit 32, and information on the timing when the DTIM information in the WiFi beacon is included, together with the DECT control signal, to the terminal 4.

As illustrated in FIG. 13, the terminal 4 that has received the DECT control signal from the DECT communication unit 31 of the base station 3 activates the WiFi communication unit 42 of the terminal 4 immediately before the timing when the DTIM information is included, on the basis of the information on the timing when the information on the time difference ΔT and the DTIM information are included. That is, the DTIM information means that the data scheduled to be transmitted to the terminal 4 is present in the base station 3, and buffering for transmission preparation has been completed, and the terminal 4 can grasp the transmission timing of the WiFi beacon transmitted together with the DTIM information by the base station 3 on the basis of the time difference ΔT received by the DECT control signal with high precision as described above, and can activate the WiFi communication unit 42 immediately before the timing of the WiFi beacon. The terminal 4 that has known that the data scheduled to be transmitted to the subject terminal 4 is present in the base station 3 by the DTIM information of the WiFi beacon transmits the PS-Poll to the base station 3.

Thus, in the example of FIG. 13, the WiFi communication unit 42 of the terminal 4 maintains the doze state immediately before the DTIM information is transmitted, and the base station 3 is activated at the timing when the WiFi beacon including the DTIM information therein is transmitted. Therefore, the doze state of the terminal 4 can be lengthened, and the power consumption of the terminal 4 can be reduced.

Third Embodiment

In the WiFi (IEEE 802.11 series), one base station must use one channel in principle, and occupy the channel when the base station is connected to a certain terminal. However, in order to deal with a plurality of terminals, "access control function" is defined as a mechanism for connecting a different terminal according to time. In this function, the terminal having data to be transmitted first transmits a signal of "RTS" (request to send") for requesting the permission of data transmission. If the base station that has received the RTS signal is in a free state (no connection with the other terminal), the base station returns a signal "CTS" (clear to send) meaning that the transmission of the data is permitted to the subject terminal. The other terminal that has intercepted the RTS or CTR signal retains from transmitting electric waves for a given period. Thus, the use of the RTS and CTS makes it possible to reduce the collision of the signals.

FIG. 14 is a diagram illustrating the third embodiment of the present invention, which is a diagram illustrating an example of transmission timing of the respective signals in the wireless communication system. When a reception period of the terminal 4 is limited as in this embodiment, it is desirable that the terminal 4 receives the WiFi beacon (called "beacon" in FIG. 14) transmitted by the base station 3 without any jam. In this embodiment, the WiFi communication unit 32 of the base station 3 transmits the CTS signal before transmitting the WiFi beacon. The respective terminals 4 that has intercepted the CTR signal retains from transmitting electric waves for a given period (NAV (network allocation vector) illustrated in FIG. 14). The CTS signal is transmitted according to the RTS signal output from the terminal 4, and the transmission of the other terminal 4 is ceased by the CTS signal, to thereby then prevent jam of the PS-Poll (power save poll) to be transmitted from the terminal 4 to the base station 3 as illustrated in FIG. 14. In this embodiment, as illustrated in FIG. 14, before transmitting the WiFi beacon, the base station 3 transmits the CTS pretends to receive a request from a certain (fanciful) terminal, thereby being capable of stopping the transmission of the respective existing terminals 4 at the timing of the WiFi beacon transmission, and preventing the WiFi beacon from being jammed by the transmission signal of the terminal 4.

The present invention has been described in detail and with reference to the specified embodiments. However, it would be apparent from a person skilled in the art that the present invention can be variously changed or modified without departing from the spirit and scope of the present invention.

The present application is based on Japanese Patent Application No. 2010-251479 filed on Nov. 10, 2010, the contents of which are incorporated herein by reference.

INDUSTRIAL APPLICABILITY

As described above, according to the present invention, in the wireless communication system having the portable terminal and a plurality of base stations that conducts a wireless communication with the terminal, the DECT communication unit and the WiFi communication unit are both provided in each of the base stations, and the beacon transmission timing of the Win communication unit in each base station is controlled with the use of the control signal issued by the DECT communication unit. As a result, each of the terminals can shorten the receiving operation, and reduce the power consumption.

REFERENCE SIGNS LIST

1: router
2: extension telephone
3a, 3b, 3c: base station
31: DECT communication unit
32: WiFi communication unit
35: base station host unit
4a, 4b: terminal
41: DECT communication unit
42: WiFi communication unit
45: terminal host unit

The invention claimed is:

1. A wireless communication system comprising:
a base station; and
a terminal,
the system conducting a communication between the base station and the terminal, wherein
the base station includes a first communication unit using a first communication system of a TDMA system, and a second communication unit using a second communication system which differs from the first communication system,
the terminal includes a third communication unit using the first communication system of the TDMA system, and a fourth communication unit using the second communication system,
the base station transmits a control signal in the first communication system with the use of the first communication unit,
the base station determines timing of transmission for the second communication unit according to timing of TDMA of the first communication unit,
the third communication unit of the terminal receives the control signal transmitted from the base station in the first communication system, and
the fourth communication unit of the terminal is activated at timing when the fourth communication unit can receive a second control signal transmitted by the second communication unit of the base station according to information included in the control signal transmitted in the first communication system.

2. The wireless communication system according to claim 1, wherein
the second communication system is a wireless LAN using a communication standard of IEEE 802.11 series, and
the second control signal is a beacon of the wireless LAN transmitted by the base station.

3. The wireless communication system according to claim 2, wherein
the first communication unit of the base station transmits the control signal with the use of a wireless frame synchronizing signal created according to a self-timer, and
the second communication unit of the base station transmits the beacon of the wireless LAN at timing obtained by correction using the self-timer of the first communication unit.

4. The wireless communication system according to claim 1, wherein
the fourth communication unit of the terminal is activated at timing when the fourth communication unit can receive the second control signal, and stops an operation of the fourth communication unit according to a signal indicative of transmission complete transmitted by the base station.

5. The wireless communication system according to claim 2, wherein when the second communication unit of the base station holds data scheduled to be transmitted to the terminal, the first communication unit transmits the control signal with information and time information being included in the control signal, wherein the information indicates that the data scheduled to be transmitted is held, and the time information indicates at which a beacon for allowing the terminal that is a destination of the data to receive the data is transmitted.

6. A wireless communication system comprising:
a plurality of base stations including a master base station, and a slave base station, and a terminal,
the system conducting a communication among the plurality of base stations, wherein each of the plurality of base stations includes a first communication unit using a first communication system of a TDMA system, and a second communication unit using a second communication system which differs from the first communication system,
the terminal includes a third communication unit using the first communication system of the TDMA system, and a fourth communication unit using the second communication system,
each of the plurality of base stations determines timing of transmission of the second communication unit according to timing of the TDMA of the first communication unit,
the master base station in the plurality of base stations transmits a control signal in the first communication system,
the slave base station in the plurality of base stations conducts a communication in the first communication system in synchronization with the control signal,
the third communication unit of the terminal receives the control signal transmitted from the master base station in the first communication system, and
the fourth communication unit of the terminal controls receiving operation according to information included in the control signal transmitted in the first communication system.

7. The wireless communication system according to claim 6, wherein
the first communication unit of each of the plurality of base stations detects a channel having a possibility of an interference according to an electric field intensity of a signal received from another surrounding base station, and notifies the second communication unit of information indicative of the channel, and
the second communication unit controls to prevent the notified channel from being used.

8. The wireless communication system according to claim 6, wherein
the second communication system is a wireless LAN using a communication standard of IEEE 802.11 series, and
the fourth communication unit of the terminal is activated at timing when the fourth communication unit can receive a beacon of the wireless LAN transmitted by one of the plurality of base stations.

9. The wireless communication system according to claim 6, wherein the first communication unit of the slave base station transmits the control signal with the use of a wireless frame synchronizing signal subjected to a correction based on the control signal from the master base station with the use of a function of an air synchronization, and each of the plurality of base stations transmits a beacon of the wireless LAN at timing obtained by a correction according to the wireless frame synchronizing signal.

10. A wireless communication device that operates as a base station in a wireless communication system that conducts a communication between the base station and a terminal, the wireless communication device comprising:
a first communication unit that uses a first communication system of a TDMA system; and
a second communication unit using a second communication system which differs from the first communication system, wherein
the base station determines timing of transmission for the second communication unit according to timing of TDMA of the first communication unit, the first communication unit transmits a control signal in the first communication system with use of a wireless frame synchronizing signal created according to a self-timer, and the second communication unit transmits a second control signal to the terminal at timing obtained by correction using the self-timer of the first communication unit.

11. The wireless communication device according to claim 10, wherein the second communication system is a wireless LAN using a communication standard of IEEE 802.11 series, and the second control signal is a beacon of the wireless LAN.

12. The wireless communication device according to claim 10, wherein when the second communication unit holds data scheduled to be transmitted to the terminal, the first communication unit transmits the control signal with information and time information being included in the control signal, wherein the information indicates that the data scheduled to be transmitted is held, and the time information indicates at which a beacon for allowing the terminal that is a destination of the data to receive the data is transmitted.

13. A wireless communication device that operates as a terminal in a wireless communication system that conducts a communication between a base station that operates as a master and the terminal, the wireless communication device comprising:

a third communication unit that uses a first communication system of a TDMA system; and a fourth communication unit that uses a second communication system which differs from the first communication system, wherein the third communication unit receives a control signal in the first communication system transmitted from the base station, and the fourth communication unit is activated at timing when the fourth communication unit can receive a second control signal transmitted by a communication unit of the base station using the second communication system according to information included in the control signal transmitted in the first communication system.

14. The wireless communication system according to claim 13, wherein the fourth communication unit starts a receiving operation with the use of the second communication system when information meaning that data addressed to the fourth communication unit is scheduled to be transmitted is included in the control signal transmitted in the first communication system.

15. The wireless communication system according to claim 13, wherein the second communication system is a wireless LAN using a communication standard of IEEE 802.11 series, and the second control signal is a beacon of the wireless LAN obtained by the information included in the control signal.

* * * * *